(12) United States Patent
Saikawa

(10) Patent No.: US 7,916,316 B2
(45) Date of Patent: *Mar. 29, 2011

(54) PRINTER AND PRINTER CONTROL METHOD FOR RESUMING PRINTING OPERATION FOLLOWING AN OUT OF PAPER ERROR

(75) Inventor: Takashi Saikawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 937 days.

This patent is subject to a terminal disclaimer.

(21) Appl. No.: 11/215,445

(22) Filed: Aug. 29, 2005

(65) Prior Publication Data

US 2006/0055973 A1    Mar. 16, 2006

(30) Foreign Application Priority Data

Aug. 27, 2004  (JP) ................ P2004-249242

(51) Int. Cl.
G06K 15/00    (2006.01)
(52) U.S. Cl. .............. 358/1.14; 358/1.15; 358/1.16; 358/1.17; 358/1.13; 347/5; 400/61; 400/62
(58) Field of Classification Search ........ 358/1.11–1.18; 347/5
See application file for complete search history.

(56) References Cited

U.S. PATENT DOCUMENTS

| 6,095,632 | A | 8/2000 | Kobayashi et al. | |
|---|---|---|---|---|
| 6,132,117 | A | 10/2000 | Fukano et al. | |
| 6,328,410 | B1 | 12/2001 | Kawase et al. | |
| 6,364,442 | B1 | 4/2002 | Kawase et al. | |
| 6,491,453 | B1 | 12/2002 | Fukano et al. | |
| 6,516,440 | B1 | 2/2003 | Teradaira | |
| 6,811,334 | B2 | 11/2004 | Koike et al. | |
| 2001/0001130 | A1 | 5/2001 | Miyasaka et al. | |
| 2001/0024585 | A1* | 9/2001 | Koakutsu et al. | 400/76 |
| 2004/0101336 | A1* | 5/2004 | Azami | 400/61 |
| 2004/0218204 | A1 | 11/2004 | Nomura | |
| 2004/0240921 | A1* | 12/2004 | Koike et al. | 400/76 |
| 2006/0055972 | A1 | 3/2006 | Saikawa | |

FOREIGN PATENT DOCUMENTS

| CN | 1739975 A | 3/2006 |
|---|---|---|
| EP | 0738596 A1 | 10/1996 |
| EP | 0 780 786 A2 | 6/1997 |
| EP | 0834800 A1 | 4/1998 |
| EP | 0945824 A2 | 9/1999 |

(Continued)

OTHER PUBLICATIONS

European Search Report dated Dec. 30, 2005.

(Continued)

Primary Examiner — King Y Poon
Assistant Examiner — David S. Cammack
(74) Attorney, Agent, or Firm — Nutter McClennen & Fish LLP; John J. Penny, Jr.; Michael P. Visconti, III

(57) ABSTRACT

Described are a printer and a method of controlling it, wherein when an out-of-paper error occurs and printing stops, a control unit clears any data in a receive buffer, and reports the out-of-paper error and print stoppage to a host computer. When a clear buffer command is then received from the host computer, the control unit clears the receive buffer again.

4 Claims, 7 Drawing Sheets

FOREIGN PATENT DOCUMENTS

| | | |
|---|---|---|
| EP | 1 093 052 A2 | 4/2001 |
| JP | 06210907 A | 8/1994 |
| JP | 06210936 A | 8/1994 |
| JP | 08-006744 | 1/1996 |
| JP | 8-011394 A | 1/1996 |
| JP | 09095025 A | 4/1997 |
| JP | 10211719 A | 8/1998 |
| JP | 11-042832 | 2/1999 |
| JP | 11-208071 | 8/1999 |
| JP | 11-268384 | 10/1999 |
| JP | 200035922 A | 8/2000 |
| JP | 2001-180052 | 7/2001 |
| JP | 2002189640 A | 7/2002 |
| JP | 3091456 | 11/2002 |
| JP | 2004-130784 A | 4/2004 |

OTHER PUBLICATIONS

Pre-Brief Appeal Conference Decision, U.S. Appl. No. 11/214,761, dated Oct. 5, 2010.
Final Office Action, U.S. Appl. No. 11/214,761, dated Apr. 15, 2010.
Non-Final Office Action, U.S. Appl. No. 11/214,761, dated Oct. 15, 2009.
Final Office Action, U.S. Appl. No. 11/214,761, dated May 22, 2009.
Non-Final Office Action, U.S. Appl. No. 11/214,761, dated Oct. 15, 2008.
Non-Final Office Action, U.S. Appl. No. 11/214,761, dated Dec. 21, 2010.

* cited by examiner

PRINTER AND PRINTER CONTROL METHOD FOR RESUMING PRINTING OPERATION FOLLOWING AN OUT OF PAPER ERROR

BACKGROUND OF THE INVENTION

1. Field of Technology

The present invention relates generally to a printer and a printer control method, and relates more particularly, to an internal process of a printer when slip printing is resumed after printing has stopped because there is no paper.

2. Description of Related Art

In a printer system having a printer, the printer is typically connected to enable communication with a host computer that generates the print data to be printed and controls printer operations. During printing, for example, the printer executes print control commands received from the host computer to print on slips or roll paper and then output the result.

If a slip that is too small is mistakenly inserted or more print data than can be printed on a single slip is sent to the printer when printing on a slip, an error is generated and printing stops because there is no paper to print on. Such errors are referred to herein as an "out-of-paper error". When an out-of-paper error occurs, the printer interrupts printing on the slip and waits for a new slip to be inserted.

When a new slip is then inserted, the printer continues printing the unprinted data. When printing thus resumes, the remaining print data that was not printed before the out-of-paper-error occurred and printing stopped is printed on the new slip. The result is that the content that should be printed on a single slip is printed on two slips, and the resulting printed output could be rendered meaningless for the intended purpose if the content thus printed on two separate slips should have been printed on a single slip, such as when printing a sales receipt. When this happens, the same print data must be sent from the host computer to the printer again and reprinted, resulting in wasteful paper consumption. The result is a significant drop in printing efficiency and thus reduced productivity considering the time and effort required to reprint the same content and the printing waste after printing resumes.

JP-A-H11-268384 teaches a printer which receives from the host computer a command instructing the printer what process to execute when the printer returns from an off-line to an on-line state, and the printer thus runs a process determined by the cause of the off-line state when the printer goes back on-line. This printer can thus be prevented from printing the remaining portion of a receipt that will most likely be unusable.

JP-A-2001-180052 teaches a printer which can select whether to store or to automatically discard new print data received while the printer is off-line. When the received data is automatically destroyed with this printer, additional data is not stored in the receive buffer while the printer is off-line, and the receive buffer will thus not become full.

JP-A-H11-268384 and JP-A-2001-180052 describe in detail a process for returning from an off-line state to an on-line state, but are silent regarding the process for recovering from an out-of-paper error. The same process used to return from an off-line state to an on-line state cannot be used when printing stops due to an out-of-paper error because the printer remains in an on-line state and does not switch from an on-line state to an off-line state when an out-of-paper error occurs. Additional consideration is therefore needed to determine the best routine for resuming printing after an out-of-paper error occurs. an out-of-paper error.

It is an object of the present invention to provide a printer and a printer control method allowing to smoothly resuming an interrupted printing operation with no printing waste after printing stops due to an out-of-paper error.

SUMMARY OF THE INVENTION

A printer according to a first aspect of at least one embodiment of the present invention has a data receiving unit for receiving data sent from a host computer; a data transmission unit for sending data to the host computer; a receive buffer for temporarily storing data received by the data receiving unit; an interpreting unit for interpreting data temporarily stored in the receive buffer; a print buffer for storing a print image when the buffered data is print data; a print mechanism for printing the print image stored in the print buffer; and a control unit for controlling the data receiving unit, the data transmission unit, the receive buffer, the interpreting unit, the print buffer, and the print mechanism. The control unit clears data from the receive buffer when an out-of-paper-error occurs and printing stops, and reports the out-of-paper error and printing stop to the host computer. When a clear buffer command is then received from the host computer, the control unit clears the receive buffer again.

Preferably, the control unit clears the receive buffer and the print buffer, and clears the print buffer again according to the clear buffer command.

Yet further, preferably, the control unit sends a buffer clearing completion report to the host computer after receiving the clear buffer command, and prints based on print data received from the host computer after the buffer clearing completion report is sent.

A printer control method according to a second aspect of the present invention has steps of: clearing a receive buffer when an out-of-paper error occurs and printing stops; reporting the out-of-paper error and print stoppage to a host computer; and clearing the receive buffer again according to a clear buffer command received from the host computer.

Preferably, this printer control method also has a step of clearing a print buffer when the out-of-paper error occurs and printing stops, and then clearing the print buffer again according to the clear buffer command.

Yet further, preferably, this printer control method also has steps of: sending a buffer clearing completion report to the host computer after receiving the clear buffer command; and printing based on print data received from the host computer after the buffer clearing completion report is sent.

An advantage of at least one embodiment of the present invention is that both the receive buffer and the print buffer are cleared of any remaining print data if an out-of-paper error occurs while printing is in progress and the printer thus stops printing. Furthermore, if print data is then received before the printer is ready to resume printing, the receive buffer and the print buffer are cleared again. As a result, no unnecessary print data remains in the printer when the printer becomes able to print again. The latter portion of the previous print data that should not be printed alone as a result of a printing stoppage due to an out-of-paper error will thus not be printed after the next slip is inserted, and a slip will thus not be wasted.

The host computer then resends the print data for which printing was interrupted to the printer from the beginning of the print data, thus enabling the printer to smoothly and continuously print the print data to a single slip of the correct size. The present invention thus also advantageously minimizes the drop in efficiency and resumes printing data continuously to a single slip when printing has been interrupted due to an out-of-paper error while printing is in progress.

A further advantage of the present invention in a printer requiring ink or toner for printing is that the useful service life of the ink cartridge or toner cartridge can be extended because the consumption of ink or toner is thus also reduced in addition to reducing paper consumption.

Other objects and attainments together with a fuller understanding of the invention will become apparent and appreciated by referring to the following description of preferred embodiments taken in conjunction with the accompanying drawings.

DESCRIPTION OF THE PREFERRED EMBODIMENTS

A printer and a printer control method according to preferred embodiments of the present invention are described below with reference to the accompanying figures.

Figure 1:
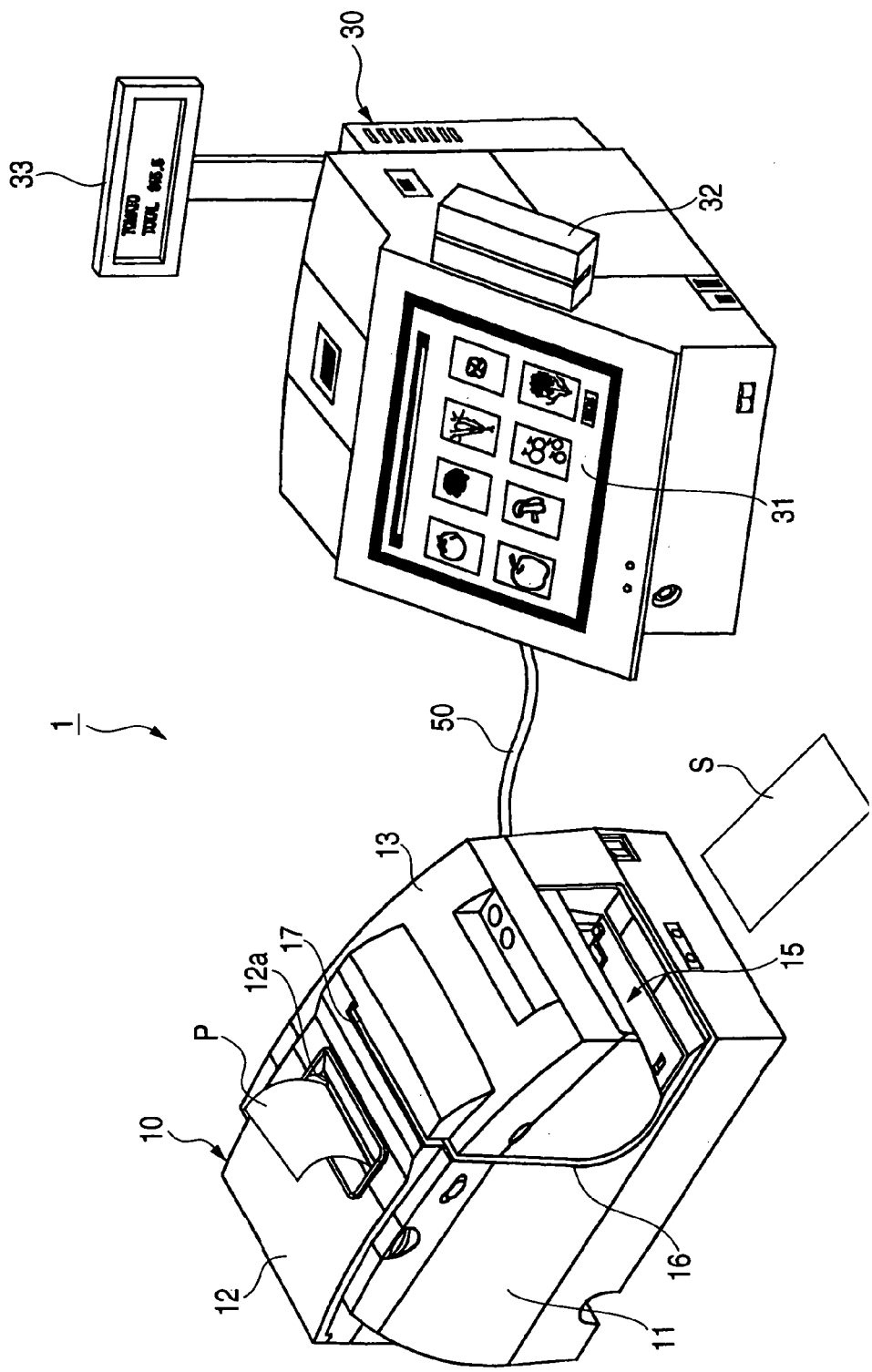
FIG. 1 is an perspective view showing a printer system according to a preferred embodiment of the present invention.

As shown in FIG. 1, a printer system 1 according to this embodiment of the invention includes a printer 10 and a host computer 30 controlling the printer 10. The printer 10 is a hybrid device capable of printing both sides of a slip S, scanning the slip S, reading magnetic ink characters on the slip S, and printing a receipt to roll paper P.

The printer 10 has a front cover 13 attached openably and closably to the main unit 11 so as to cover the front top part of the main unit 11, and a back cover 12 attached openably and closably so as to cover the top rear portion of the front cover 13.

A roll paper compartment is formed between the back cover 12 and the main unit 11 of the printer 10. Roll paper P is held in this roll paper compartment. The roll paper P is printed by a print head not shown while being advanced through a roll paper transportation path rendered inside the main unit 11. The printed roll paper P is then discharged from a roll paper exit 12a formed in the top of the back cover 12. The leading end of the roll paper P is shown discharged from the roll paper exit 12a in FIG. 1. This roll paper P is cut either automatically or manually according to the length of the print data and then issued as a single receipt.

A slip insertion slot 16 for inserting slip S is formed below the front cover 13 of the printer 10. A slip S inserted into the slip insertion slot 115 is conveyed through the slip transportation path 16 formed in the main unit 11, and is discharged from a slip exit 17 formed between the front cover 13 and back cover 12. The slip S can be printed and scanned, and magnetic ink characters printed an the slip S can be read, while the slip S is conveyed through, the slip transportation path 16.

Figure 2:
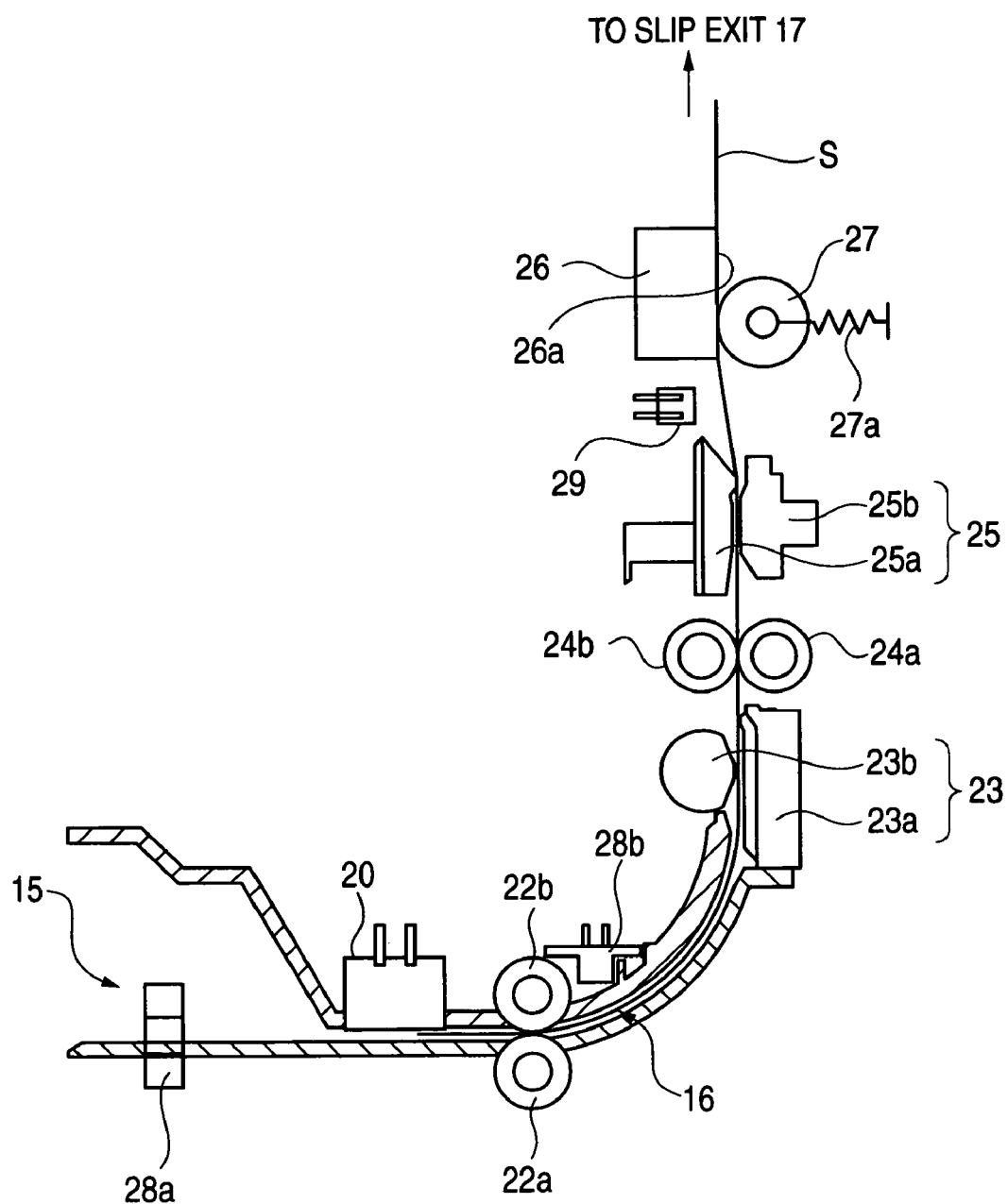
FIG. 2 is a schematic section view showing the slip S transportation path.

As shown in FIG. 2, a slip S inserted into the slip transportation path 16 is conveyed to a back printing unit 23, which is disposed at the slip transportation path 16 downstream from the slip insertion slot 15, by a slip feed subroller 22a and a slip feed pressure roller 22b disposed opposite the slip feed subroller 22a with the slip transportation path is therebetween.

The back printing unit 23 is composed of a serial impact dot matrix print unit 23a disposed facing the back side of the slip S, and a platen 23b disposed opposite the print unit 23a with the slip transportation path 16 therebetween. This print unit 23a can thus print on the back of the slip S.

Slip transportation roller 24a and slip pressure roller 24b disposed opposite the slip transportation roller 24a with the slip transportation path 16 therebetween convey the slip S downstream from the back printing unit 23 to the front printing unit 25 disposed on the slip transportation path 16. The slip feed subroller 22a and slip transportation roller 24a are rotationally driven by a stepping motor not shown. A stepping motor is a motor that can be controlled to turn a specific number of steps so that the motor turns a specific angle of rotation by controlling the number of pulses output to the stepping to motor. The transportation distance of the slip S is thus known in this printer 10 from the angle of rotation of the stepping motor.

The front printing unit 25 is composed of a serial impact dot matrix print unit 25a disposed facing the front side of the slip S, and a platen 26b disposed opposite the print unit 25a with the slip transportation path 16 therebetween. This print unit 25a can thus print on the front of the slip S.

A slip S conveyed further downstream from the front printing unit 25 advances to the slip image scanner 26.

The slip image scanner 26 is a contact image sensor (CIS) type of image scanner, and is positioned facing the front of the slip S. A pressure roller 27 is disposed opposite the slip image scanner 26 with the slip transportation path 16 therebetween. The pressure roller 27 has a pressure member 27a which is an elastic member for pressing the slip S onto the scanning surface 26a of the slip image scanner 26 with a specific pressure determined by the paper thickness. The slip image scanner 26 captures an image of the information recorded on the front of the slip S while the pressure roller 27 presses the slip S against the scanning surface 26a.

The slip S is then discharged from the slip exit 17 after passing between the slip image scanner 26 and pressure roller 27.

A trailing end sensor 28a is disposed at the slip insertion slot 15, and a leading end sensor 28b is disposed downstream from the slip feed pressure roller 22b. The trailing end sensor 28a and leading end sensor 28b are used to check if a slip S is present in the slip transportation path 16, to detect the length of the slip S, and to index the slip S for printing by the back printing unit 23 and front printing unit 25.

A discharge detector 29 is disposed between the front printing unit 25 and the slip image scanner 26, and detects if the slip S has been discharged from the slip transportation path 16.

A magnetic ink character recognition (MICR) sensor 20 is disposed near the slip insertion slot 15 of the slip transportation path 16. This MICR sensor 20 is used for reading magnetic ink characters printed in magnetic ink on the slip S. If the slip S is a check, for example, the magnetic ink characters typically include the number of the bank, the branch number, and the number of the account against which the check is issued, as well as a check serial number. This information can thus be read using the MICR sensor 20, enabling the printer 10 to recognize the MICR data on an inserted check.

A printer 10 according to this embodiment of the invention also has a CPU and internal memory. The CPU reads and runs firmware stored in nonvolatile memory such as a flash ROM, for example, to control printer operations, including printing. Control of this printer 10 is described more specifically below.

The host computer 30 is described first next.

The host computer 30 is connected by a serial cable, USB cable, or other communication cable 500. Although not shown, the printer and the host computer could alternatively be connected to communicate wirelessly. The host computer 30 in this embodiment of the invention has input devices such as a touch panel 31 and card reader 32, generates, print data based on input from the touch panel 31 and card reader 32, and sends the resulting print data to the printer 10 over the communication cable 500. The printer 10 then prints on roll paper or a slip based on this print data.

A host computer having a touch panel 31 and card reader 32 is used by way of example in the present embodiment of the invention. Any device capable of controlling the printer 10 can be used instead, and the host computer could be based on a common personal computer, for example.

Internal processes of the printer 10 are described next.

Figure 3:
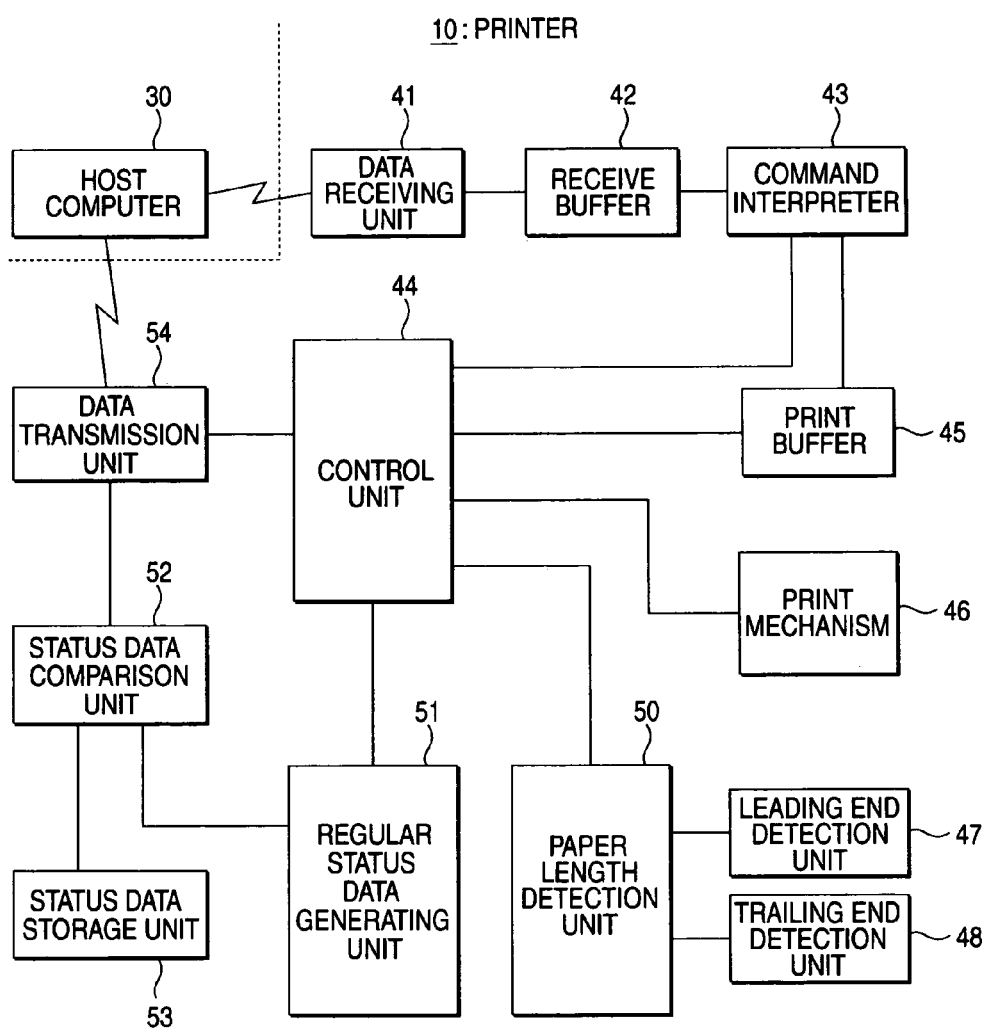
FIG. 3 is a schematic function block diagram showing the internal control configuration of the printer system shown in FIG. 1.

As shown in FIG. 3 the printer 10 has an internal data receiving unit 41, receive buffer 42, command interpreter 43, control unit 44, print buffer 45, print mechanism 46, leading end detection unit 47, trailing end detection unit 48, paper length detection unit 50, regular status data generating unit 51, status data comparison unit 52, status data storage unit 53, and data transmission unit 54.

The data receiving unit 41 is a data communication unit for receiving print data and commands sent from the host computer 30, and includes a communication interface. The data receiving unit 41 sequentially stores the received data in the receive buffer.

The receive buffer 42 is a data storage unit, which can be a line buffer or ring buffer type, and stores the date received by the data receiving unit 41 in the order received.

The command interpreter 43 reads the data stored in the receive buffer 42 in a first-in, first-out (FIFO) sequence and interprets the content. If the received data is print data, the print data is converted to a bitmap image in the print buffer 45 with reference to a font ROM, for example. If the received data is a control command for the printer 10, the control unit 44 controls the other function units according to the command content and thus provides overall control of the printer 10. Based on the paper length detected by the paper length detection unit 50 described below, the control unit 44 decides whether to stop printing due to an out-of-paper error.

The print mechanism 46 is a printing unit for driving transportation rollers not shown to advance the paper while driving a print head to print. The print mechanism 46 renders paper transportation control and print head control based on the print image written to print buffer 45, and thus prints to a slip S or roll paper P.

The leading end detection unit 47 is a detection unit which detects if the leading end sensor 28b has detected the leading end of a slip S. If the leading end sensor 28b detects the leading end of a slip S, the leading end detection unit 47 outputs a paper detection signal to the paper length detection unit 50.

The trailing end detection unit 48 is a detection unit which detects if the trailing end sensor 28a has detected the trailing end of a slip S. If the leading end sensor 28b detects the trailing end of a slip S, the trailing end detection unit 48 outputs a paper detection signal to the paper length detection unit 50.

The paper length detection unit 50 detects the length of the slip S in the transportation direction based on the detection signal from the leading end detection unit 47, the detection signal from the trailing end detection unit 48, and the transportation distance of the slip S determined from the angle of stepping motor rotation.

More specifically, the paper length detection unit 50 calculates the length of the slip S based on the distance the slip S is conveyed between the moment at which the leading end detection unit 47 detects the leading end (the time when leading end detection unit 47 output changes from the no-paper state to the paper-detected state) and the moment at which the trailing end detection unit 48 detects the trailing end of the slip S (the time when trailing end detection unit 48 output changes from the paper-detected state to the no-paper state).

The regular status data generating unit 51 monitors the status of an error detection unit, cover detection unit, paper detection unit, off-line detection unit, and other detection units not shown, and regularly collects and generates printer status data based on outputs from these other units. The regular status data generating unit 51 outputs the resulting status data to the status data comparison unit 52 as the status data is generated.

The status data comparison unit 52 is a comparator for comparing the current status data generated by the regular status data generating unit 51 and the previous status data stored in the status data storage unit 63. Note that the status data stored in the status data storage unit 53 is the previous status data produced by the regular status data generating unit 51. Thus, comparing this status data enables knowing if the internal status of the printer 10, which is denoted by the current status data detected when the status data was most recently monitored, has changed from the internal status of the printer 10 as denoted by the status data detected the previous time the status data was monitored.

If the status data produced by the regular status data generating unit 51 is the same as the status data previously stored in the status data storage unit 53, the internal status of the printer 10 has not changed and the comparison process ends. If the previous and current status data are different, there has been a change in the internal status of the printer 10. The status data comparison unit 52 therefore updates the status data stored in the status data storage unit 53 to the new (current) status data, and sends the current status data as a status signal through the data transmission unit 54 to the host computer 30. This process is known as an Automatic Status Back (ASB) function, and this ASB function enables the host computer 30 to always know the current internal status of the printer 10.

The processes run in this embodiment of the invention when the printer goes off-line because there is no paper is described in detail below.

As a result of receiving a reset operation setup command (1) as shown below from the host computer 30, a printer 10 according to this embodiment of the invention can select the process to run when printing stops due to an out-of-paper error.

$$\text{GS (J 80 m(} \hspace{5em} 1)$$

"GS (J 80" denotes the reset operation setup command relating to the process to be executed when printing stops due to an out-of-paper error. The argument m of this command is either 0 or 1. When argument m=0, the control unit 44 runs the normal operating process. When argument m=1, the control unit 44 runs a process for preventing wasting printing and paper when returning to the on-line state. More specifically, the printer 10 runs the internal processes described below depending upon whether m=0 or m=1. The following processes are executed automatically when printing stops due to an out-of-paper error.

When m=0: normal operation
(1) Do not clear the receive buffer and the print buffer;
(2) If a command was being processed when the out-of-paper error occurred, the corresponding command process continues.

When m=1: paper-saving mode
(1) Clear the receive buffer and the print buffer;
(2) If a command was being processed when the out-of-paper error occurred, abort the corresponding command process (and do not continue executing the command after error recovery);
(3) Discard and do not store in the receive buffer any data received from when the out-of-paper error occurred until the printer returns on-line (this process is not part of the process returning the printer on-line);
(4) Send a clear response to the host computer 30.

Figure 4:
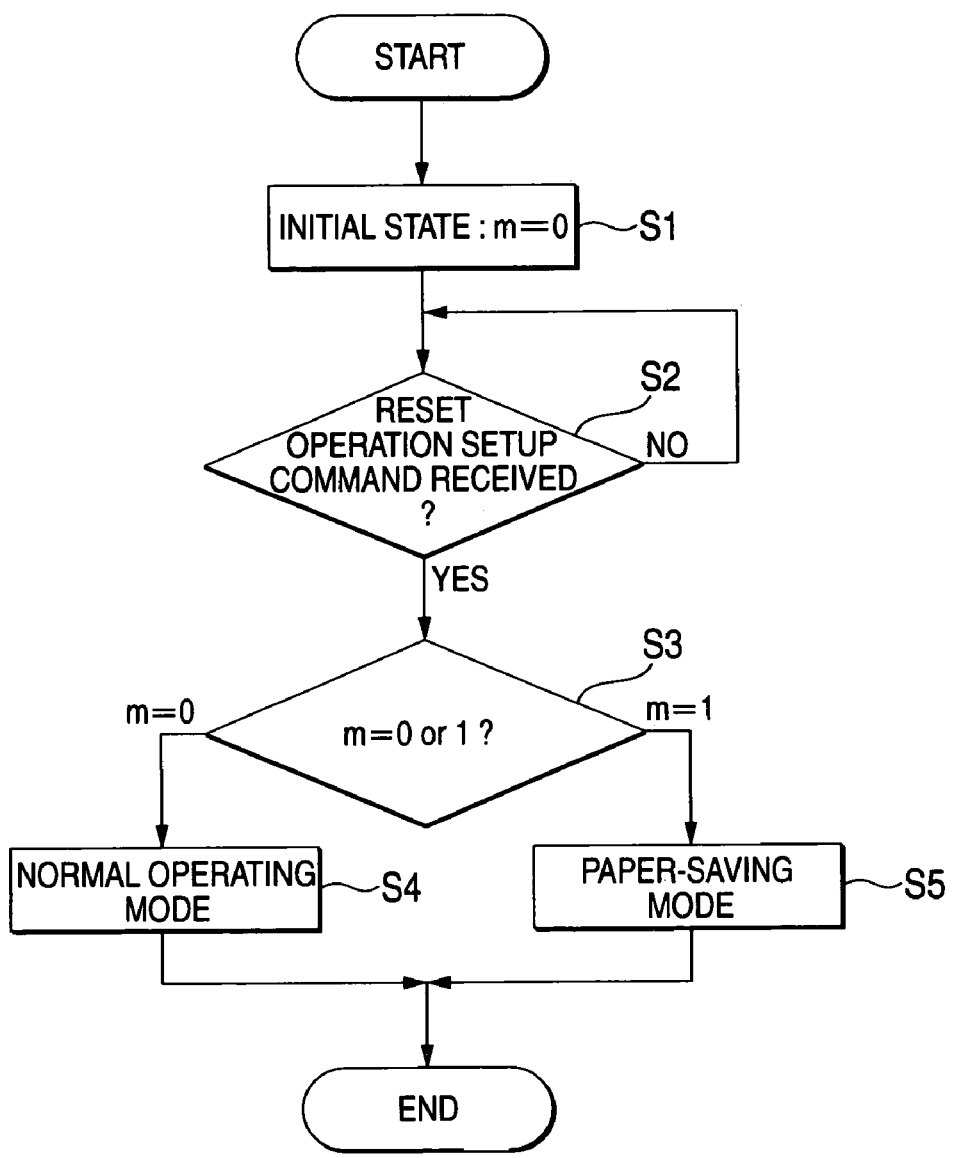
FIG. 4 is a flow chart of a printer control process.

This process is described further below with reference to FIG. 4.

When this process starts, the printer 10 is initially set to m=0, and the printer 10 changes the operating mode when the command shown in statement (1) above is received. More specifically, the printer 10 is set to the normal operating mode based on the initial m=0 setting (step S1), and waits to receive the reset operation setup command in step S2.

When the reset operation setup command is then received, the printer 10 reads the value of argument m (step S3). If m=0, the normal operating mode is reset in step 84. If m=1, the paper-saving mode is set in step S5. The reset operation setup command can be set by the host computer 30 according to the type of printing as specified by the user.

The paper-saving mode which is executed when m=1 is described in detail next.

Figure 5:
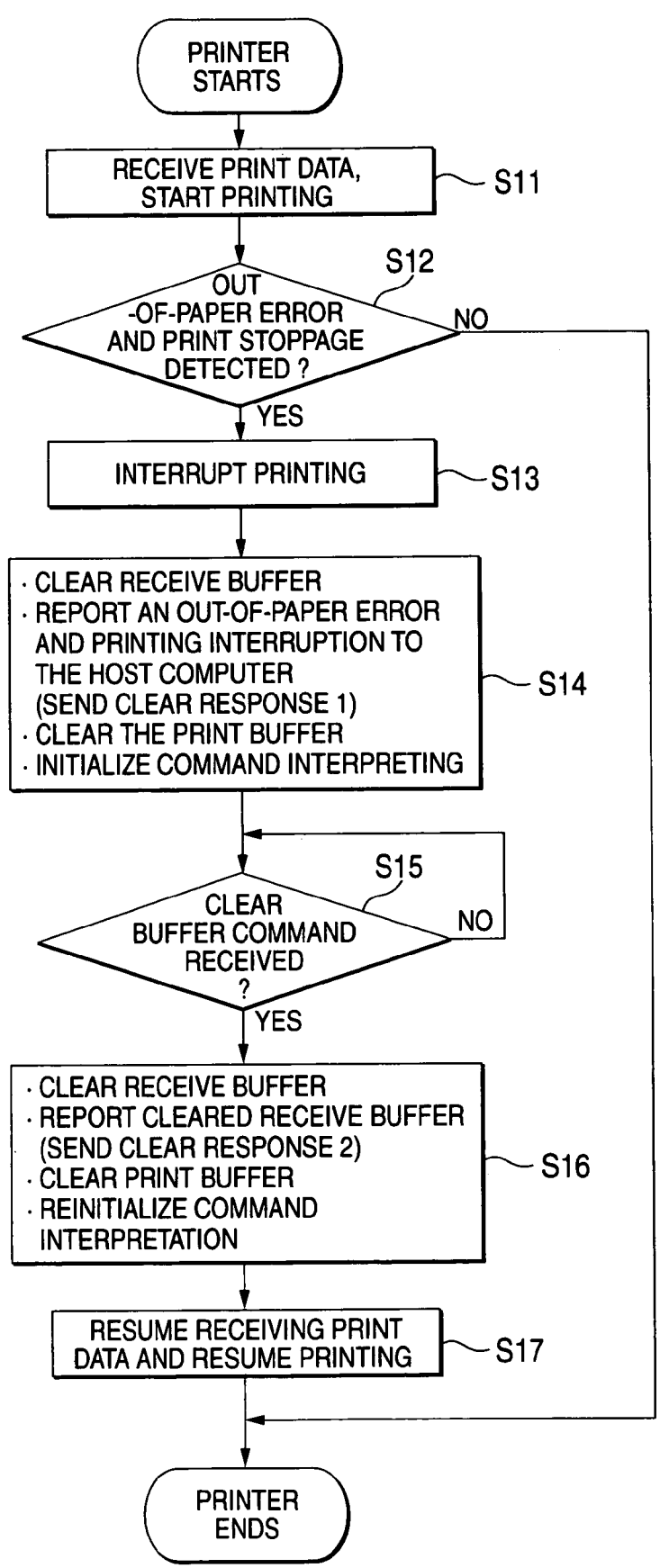
FIG. 5 is a flow chart of a printer control process.
Figure 6:
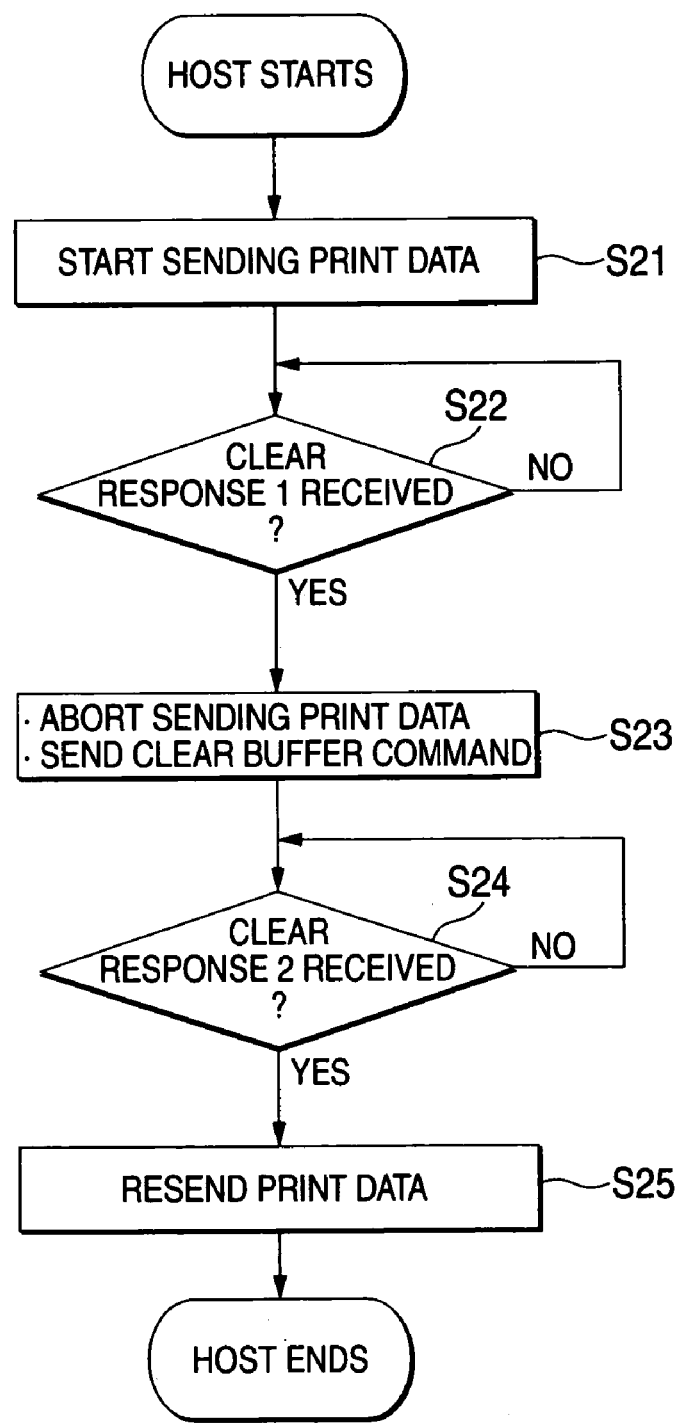
FIG. 6 is a flow chart of a host computer control process.
Figure 7:
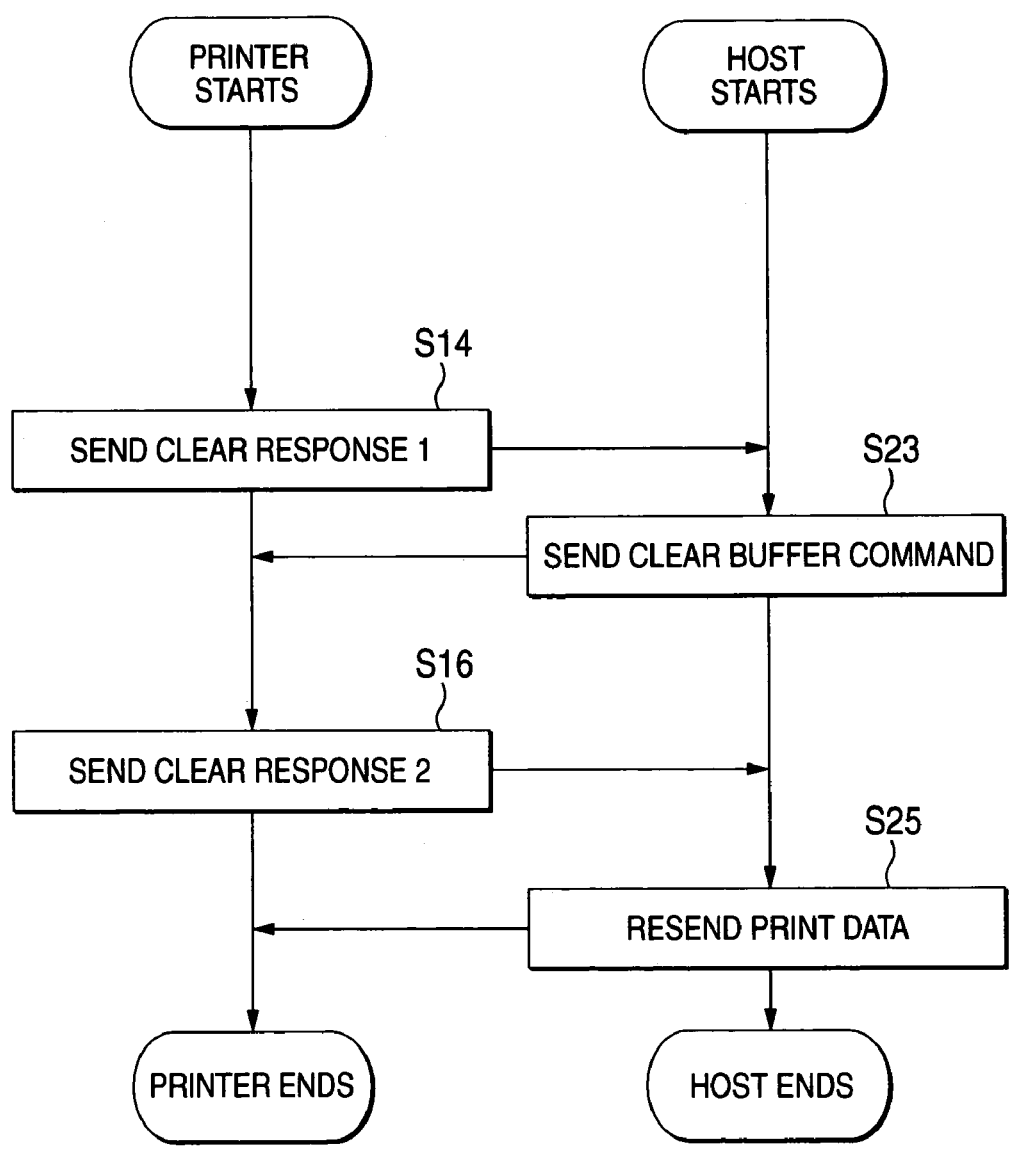
FIG. 7 is a timing chart showing commands sent between the host computer and printer.

FIG. 5 is a flow chart showing the process run by the printer 10 in the paper-saving mode when m=1. FIG. 6 is a flow chart showing the process run by the host computer 30 in the paper-saving mode when m=1. FIG. 7 is a timing chart showing the commands communicated between the host computer and printer. The processes executed by the printer 10 and host computer 30 are described in chronological order with reference to FIG. 6, FIG. 6, and FIG. 7 below.

When the printer 10 is on-line and the host computer 30 sends print data to the printer 10 as shown in FIG. 6 (step S21), the printer 10 receives the print data and starts printing on the slip S by means of the print mechanism 46 as shown in FIG. 5 (step S11).

The printer 10 then continues printing the slip S while the paper length detection unit 50 detects the paper length. The control unit 44 compares the paper length detected by the paper length detection unit 50 with the length of the print data (such as the number of lines) received for a single continuous print job, and determines if all of the received print data can be printed on one slip S, that is, if an out-of-paper error will occur and printing will thus stop (step S12). If the length of the print data enables printing all print data on the slip S, step S12 returns NO, printing ends, and the printing process ends.

If the control unit 44 determines that not all print data can be printed to the slip S, the control unit 44 runs the process stopping printing due to an out-of-paper error while the printer remains online, and thus interrupts printing on the slip S (step S13). The control unit 44 of the printer 10 then runs the following three processes (step S14):

(a) Clear receive buffer
(b) Report an out-of-paper error and printing interruption to the host computer (send clear response 1)
(c) Clear the print buffer
(d) Initialize command interpreting In process (a) the printer 10 discards any data received from the host computer 30 and stored in the receive buffer 42 just before the out-of-paper error occurred. The data stored in the receive buffer 42 may include unprinted data that should be printed to the slip 5 that was being printed when printing was interrupted, and this unprinted data is also deleted from the printers 10 memory. This prevents printing the unprinted data left in the receive buffer 42 when printing resumes, and thus prevents printing a slip S containing only the last portion of the previously transmitted print data.

Process (b) informs the host computer 30 that an out-of-paper error occurred and printing is stopped. To execute this process, the control unit 44 sends a response command called clear response 1 through the data transmission unit 54 to the host computer 30.

The print image data stored in the print buffer 45 is discarded in process (c). When printing stops due to an out-of-paper error while printing, an unprinted print image may remain in the print buffer 45. Process (c) thus clears the print image from the print buffer 45 to prevent unnecessary printing.

In process (d) the command interpreting process of the command interpreter 43 is initialized, the print data being processed is thus ignored, and the command interpreter 43 is initialized to interpret the print commands received for the print data received next.

The printer 10 then monitors whether a clear buffer command was sent as the response command to clear response 1, and the printer 10 waits until this clear buffer command is received (step 915).

Meanwhile, as shown in FIG. 5, when the host computer 30 receives clear response 1 in step S22 and thus knows that the printer 10 stopped printing due to an out-of-paper error, the host computer 30 immediately interrupts sending print data and sends a clear buffer command to the printer 10 (step S23).

The clear buffer command is a command causing the printer 10 to clear the internal receive buffer and the print buffer again.

Clearing the buffers a second time may be considered unnecessary because the printer 10 has already cleared the receive buffer 42 and the print buffer 45 in step 814, but clearing the buffers may be necessary for the reasons described below.

While no problem occurs if the printer 10 receives no print data after clearing the receive buffer 42 and print buffer 45, the printer 10 does not go off-line when an out-of-paper error occurs and thus receives and writes to the receive buffer 42 any print data that is sent from the host computer 30 after the buffer is cleared and before the host computer 30 stops sending data. If this received data is stored in the receive buffer 42, part of the last part of the print data that was not previously printed will be printed when a slip S is inserted and the out-of-paper error is cleared, and this slip S will thus be wasted.

To prevent this problem, the receive buffer 42 and print buffer 46 are preferably cleared again after step S14. The clear buffer command sent in step S23 is this command for clearing the buffers.

The host computer 30 receives a print termination command from the printer 10 each time printing one line of print data ends, and stores all of the print data that is sent or is to be sent to the printer 10 for one receipt until a print termination command indicating that the last line of the receipt being printed has been printed is received from the printer 10. As shown in FIG. 5 and FIG. 6 printing stops because of an out-of-paper error and the last line of print data is thus not printed, the print data to be printed on a slip S is saved for retransmission after the printer 10 cancels the out-of-paper error and resumes printing.

If printer 10 receives the clear buffer command in step S15, the control unit 44 of the printer 10 executes the following four processes in step S16.

(d) Clear receive buffer;
(e) Report cleared receive buffer (send clear response 2)
(f) Clear print buffer
(g) Reinitialize command interpreting Considering the possible presence of print data sent from the host computer 30 after step S14 is executed, step S16 repeats the buffer clearing and initialization operations of the process executed in step S14. The printer 10 then sends clear response 2 to the host computer 30 and the host computer 30 thus knows that the buffer has been cleared, The host computer 30 waits in step S24 to receive clear response 2, and in step S25 resends the print data starting from the first line of the interrupted print job when clear response 2 is received The printer 10 thus again receives the receipt print data from the host computer 30, and waits for paper to be loaded. When a slip S of the appropriate size is then inserted into the slip insertion slot 15, the printer 10 reprints the slip S from the beginning of the print data.

Processing by the foregoing printer 10 according to this embodiment of the invention is described above.

As described above a printer 10 according to this embodiment of the invention has a data receiving unit 41 for receiving data sent from a host computer 30, a data transmission unit 54 for sending data to the host computer 30, a receive buffer 42 for temporarily storing data received by the data receiving unit 41, a command interpreter 43 for interpreting data temporarily stored in the receive buffer 42, a print buffer 45 for storing print image dae when the data interpreted by the command interpreter 43 is print data, a print mechanism 46 for printing based on the print image written to the print buffer 45, and a control unit 44 for controlling the data receiving unit 41, receive buffer 42, command interpreter 43, print buffer 46, and print mechanism 46.

When an out-of-paper error occurs and printing stops, the control unit 44 clears the data stored in the receive buffer 42 and sends clear response 1 to report the out-of-paper error to the host computer 30. The control unit 44 then clears the receive buffer 42 again according to a clear buffer command received from the host computer 30. More particularly, the control unit 44 clears the receive buffer 42 and the print buffer 45, and clears the receive buffer 42 and print buffer 45 again when a clear buffer command is received.

Therefore, when an out-of-paper error occurs while printing is in progress and printing is thus interrupted, the receive buffer 42 and print buffer 45 are cleared twice of the print data that was being printed and no data to be printed remains in the printer 10 when the printer 10 is again able to print. The remaining unprinted portion of the receipt that was being printed when the out-of-paper so error occurred will thus not be printed when the printer returns to the on-line state, and a slip S will thus not be wasted.

Furthermore, a single slip S can be smoothly printed because the host-computer 30 resends all print data for which printing was interrupted to the printer 10. The drop in efficiency can thus be minimized and continuous printing can be resumed even if an out-of-paper error occurs during printing and printing is thus interrupted.

The present invention has been described using by way of example a printer as shown in FIG. 1. The invention is not limited, however, to this particular printer and can be applied to various kinds of printers, including inkjet printers, laser printers, dot impact printers, and thermal printers. When applied in a printer that requires ink or toner to print, the present invention reduces ink and toner consumption in addition to reducing paper consumption, and thus also contributes to extending the useful service life of ink cartridges and toner cartridges.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The invention claimed is:

1. A printer comprising:
    a data receiving unit for receiving data sent from a host computer;
    a data transmission unit for sending data to said host computer;
    a receive buffer for temporarily storing data received by said data receiving unit;
    an interpreting unit for interpreting data stored in said receive buffer;
    a print buffer for storing a print image generated in response to print data among said data stored in said receive buffer;
    a print mechanism for printing said print image stored in said print buffer;
    a detecting unit for detecting an out-of-paper error; and
    a control unit for controlling said data receiving unit, said data transmission unit, said receive buffer, said interpreting unit, said print buffer, and said print mechanism;
    wherein said control unit is adapted, in response to the out-of-paper error detected by the detecting unit,
        to stop printing,
        to clear said data in said receive buffer,
        to send said out-of-paper error and a printing stop report to said host computer while keeping the printer on-line;
    wherein said control unit is further adapted
        to clear said receive buffer again in response to a clear buffer command which is sent from the host computer in response to the out-of-paper error,
        to send a buffer clearing completion report to said host computer after receiving said clear buffer command, and
        to print based on print data received from said host computer after said buffer clearing completion report is sent.

2. The printer as described in claim 1, wherein said control unit is adapted to clear said receive buffer and said print buffer when said out-of-paper error occurs and printing stops, and to clear said print buffer again in response to said clear buffer command which is sent from the host computer in response to the out-of-paper error.

3. A method of controlling a printer communicatively connected to a host computer and having a receive buffer for temporarily storing data received from the host computer, and a print buffer for storing a print image generated in response to print data among the data stored in said receive buffer, the method comprising the steps of:

a) detecting an out-of-paper error and, in response to the out-of-paper error, stopping printing, clearing the receive buffer, and sending said out-of-paper error and a printing stop report to a host computer while keeping the printer-on line;

b) detecting reception of a clear buffer command which is sent from said host computer in response to the out-of-paper error, after the detection in step a);

c) clearing said receive buffer again in response to the clear buffer command detected in step b);

d) sending a buffer clearing completion report to said host computer after receiving said clear buffer command; and e) printing based on print data received from said host computer after said buffer clearing completion report is sent.

4. The method as described in claim 3, further comprising a step of:

f) clearing the print buffer when said out-of-paper error occurs and printing stops, and then clearing said print buffer again in response to said clear buffer command which is sent from the host computer in response to the out-of-paper error.

* * * * *